INVENTOR
DELMAR O. SEEVERS
BY
ATTORNEYS

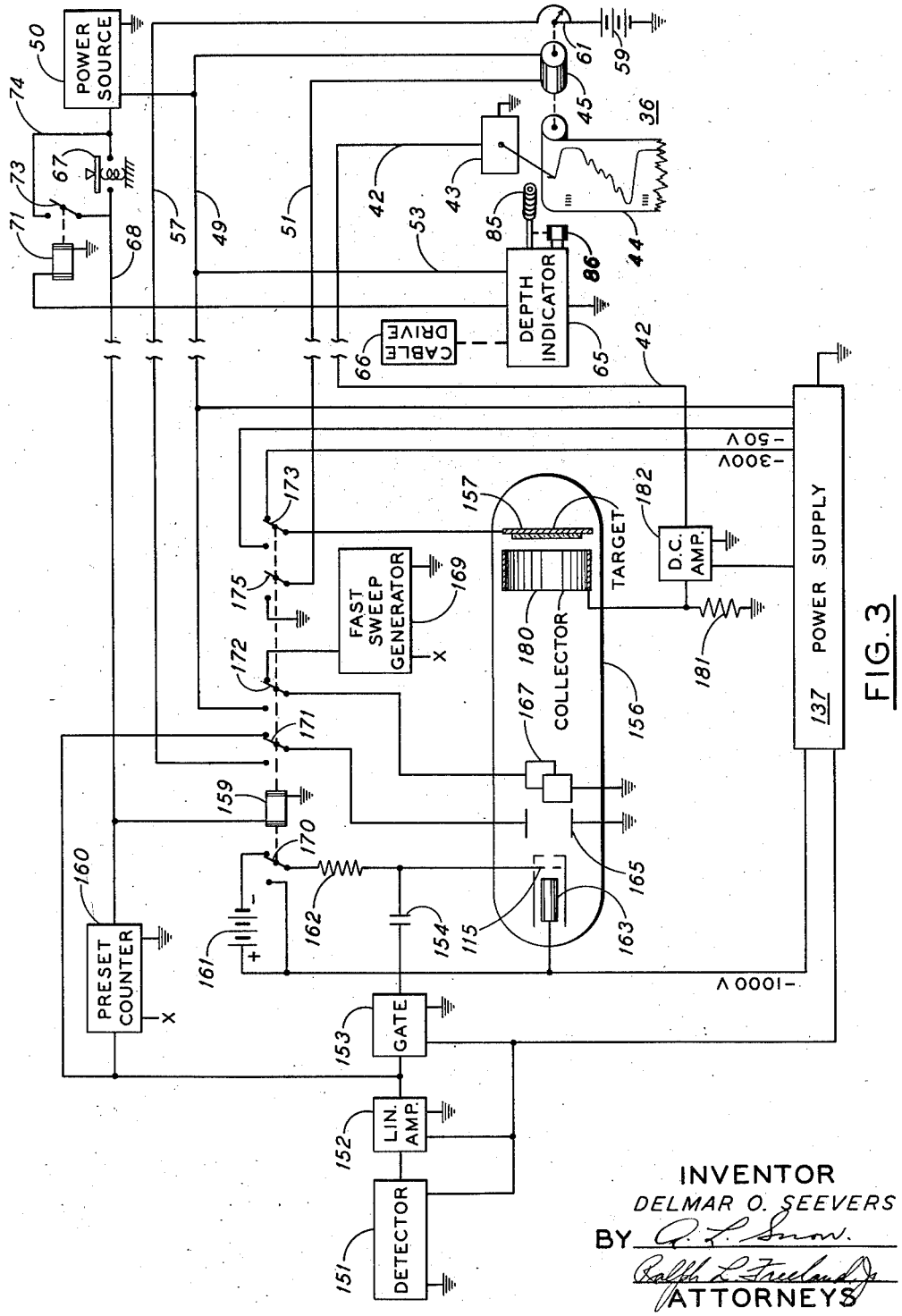

United States Patent Office 2,802,951
Patented Aug. 13, 1957

2,802,951

FREQUENCY TRANSFORMING SYSTEM FOR WELL BORE SIGNALING

Delmar O. Seevers, Fullerton, Calif., assignor to California Research Corporation, San Francisco, Calif., a corporation of Delaware Application May 28, 1954, Serial No. 433,244

9 Claims. (Cl. 250—71)

The present invention relates to a method of, and apparatus for, transforming information in the form of high-frequency signals into a form of low-frequency signals for signaling in a well bore, and more particularly relates to a method of, and apparatus for, recording at the earth's surface variations in the magnitude of quantities measured along a bore hole as an indication of the values of a plurality of measurable characteristics of earth formations traversed by the well bore, and has for an object the provision of a system for recording at the earth's surface summations of randomly-occurring electrical pulses of short duration and varying relative amplitudes developed in the bore hole as a measure of a plurality of characteristics of earth formations, such as the electrical pulses produced by a scintillation crystal and photomultiplier tube combination used in measuring radiations arising from an earth formation.

In the art of well bore signaling, it has been proposed that certain high-frequency forms of information developed within the well bore, as a measure of a plurality of characteristics of the earth formations being investigated, be transmitted to surface recording equipment over coaxial or single conductor cables by means of frequency modulation, band-pass filtering or by direct transmission of the high-frequency form of signal. Unfortunately, none of the systems proposing the use of coaxial cables has been adopted in field practice because of the problem of constructing a coaxial cable having sufficient mechanical strength to support even its own weight for more than a few hundred feet, and at the same time having both a suitably small diameter and the desired high-frequency transmission characteristics. Since most well logging requires a cable to traverse several thousand feet of well bore and support at its end a large weight, it is essential that the cable have considerable mechanical strength. The proposal that high-frequency signals be sent over a single conductor cable having adequate mechanical strength has not been found possible to realize because of the inability of such a cable to transmit signals having a band width of more than a few kilocycles per second. Thus, high-frequency information ranging upward to about 4 megacycles cannot be transmitted satisfactorily over presently-known transmission systems, except over such limited depths, or by use of such high energy inputs, as to be economically unfeasible.

It has become increasingly important in the field of radioactivity well logging to be able to transmit high-frequency information where it is desired to detect and measure individual radiation quanta. In the logging of natural gamma radiations, such as those emanating from radio-active potassium, uranium, and thorium, it is desirable to be able to measure the individual energy of each quantum and the relative frequency of occurrence of each quantum energy in order to obtain the ratios of these materials for geological correlation. The total number of quanta may range upwardly to about 100,000 which must be detected, measured, and corresponding signals transmitted to the earth's surface for each analysis of an earth formation adjacent the well bore. And even though these data may be accumulated over several seconds, the individual electrical pulses generated in response to individual quantum are of such short duration that they require a high-frequency transmission system, if they are to be received at the earth's surface in a form sufficiently undistorted to permit useful measuring and recording thereof. This same problem is also presented in measuring and recording induced gamma radiation and neutron-capture gamma radiation quanta, but the problem is further aggravated by the necessity of handling the characteristic pulses at a rate up to about one million counts per second.

Since multi-conductor D. C. cables are almost universally used by well logging service companies in conventional electric logging to measure and self-potential existing along a bore hole, such cables are readily available for logging virtually any depth of well bore, with assurance that the detecting instruments suspended therefrom can be successfully run without danger of loss in the well bore. For this reason, it has long been desired to be able to transmit high-frequency forms of information over a standard multi-conductor well logging cable.

In accordance with the present invention, the use of a standard multi-conductor cable, essentially of the D. C. transmission type, may be employed in carrying out a method of signaling wherein signals of a high-frequency form generated in the well bore are transformed into signals of essentially a low-frequency form for transmission and recording at the earth's surface. In carrying out the method of the present invention, electrical pulses are generated in the well bore in response to a plurality of measurable quantities detected therein, indicative of the characteristics of an earth formation traversed by the well bore, and applied to a charge-modifiable storage surface positioned in the well bore, each of the electrical pulses being positioned on the charge-modifiable surface in accordance with the magnitude and frequency of occurrence of the electrical signals. The location and extent of the electrical charge modifications of said surface are then selectively detected to generate an electrical signal of substantially low-frequency form, independent of the system for applying the charge modifications to said surface, and said signal transmitted to the earth's surface for recording in accordance with the depth of the earth formation whose characteristics have been measured.

In a preferred form of apparatus for carrying out the method of the present invention, a high-frequency form of electrical pulse is generated in response to the arrival of an individual radiation quantum at a detector, such as a scintillation crystal and photomultiplier tube combination. Each pulse is then stored on a electrostatic, charge-modifiable surface at a location selected in accordance with the magnitude of the pulse. Such storage is accomplished by permitting a cathode ray beam to strike the charge-modifiable surface, sometimes called a target, which has a normally non-conducting surface in direct contact with a conducting surface. The non-conducting surface is modifiable by the cathode ray beam to store electrostatic charges variable in energy and location in accordance with the magnitude and time or frequency of occurrence of each electrical pulse. The locations and energies, or intensities, of the electrostatic charges, in accordance with the invention, are accumulated over a predetermined time interval, or in response to a predetermined number of pulses, so that there may be accumulated on the storage target a statistically-reliable number of pulses representative of the energy spectra sampled by the scintillometer arrangement. Circuit means are then provided for developing an electrical signal, of substantially a low-frequency form, modulated in accordance with the location and extent of the charge modification of the target surface or electrode.

In one form of apparatus, the cathode ray beam penetrates the conducting surface to apply the electrostatic charge modifications to the non-conducting surface, and the electrical signal is developed by an independent cathode ray beam directed against the non-conducting surface of said target member. The signal derived from the non-conducting surface is then transmitted over a well logging cable to a recording means positioned at the earth's surface so that the signal may be recorded in accordance with the depth of the detecting means in the well bore.

In an alternative form of apparatus for carrying out the method of the invention, the independently-developed electrical signal, of substantially low-frequency form, is generated by an electrical circuit which utilizes the same cathode ray beam as the one that produced the changes on the target surface.

Further objects and advantages of the present invention will become apparent from the following detailed description taken in conjunction with the accompanying drawings which form an integral part of the present specification.

In the drawings:

Fig. 3 is a schematic representation of an alternative form of apparatus which may be employed in the frequency transforming system illustrated in the arrangements of Figs. 1A and 1B.

Figure 1A:
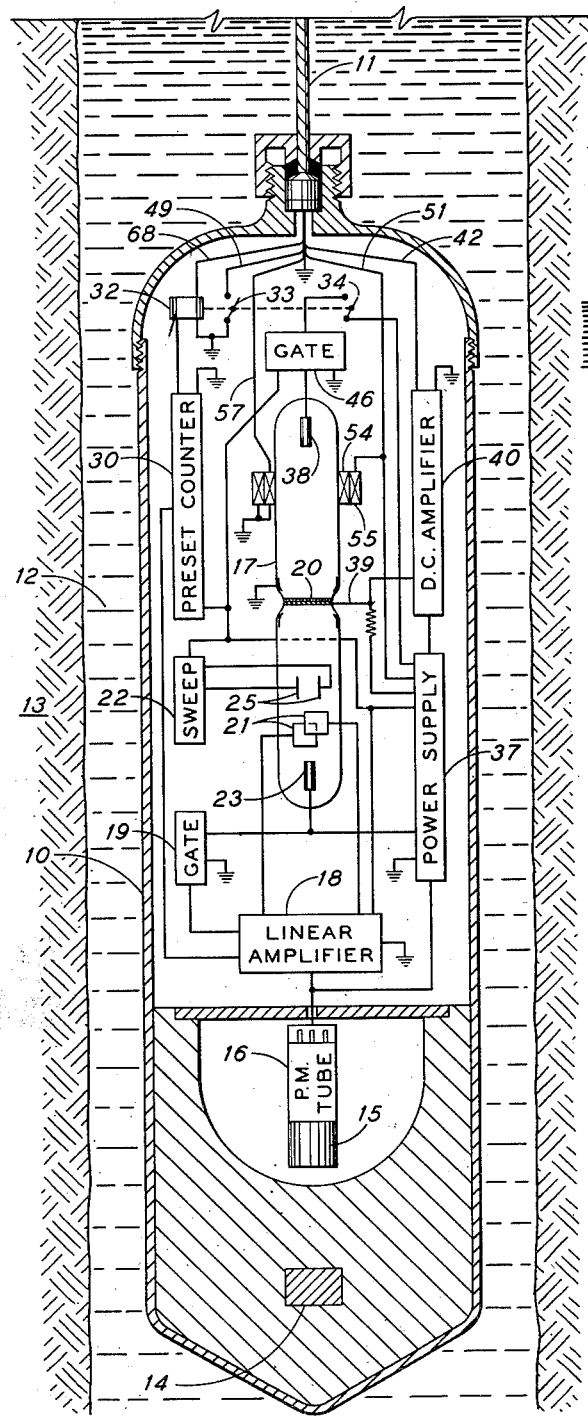
Fig. 1A is a schematic cross-sectional view of a well logging sonde which incorporates the frequency transforming system of the present invention adapted to transmit as a low-frequency signal the intelligence contained in a high-frequency signal, over a standard well logging cable upon which the sonde is raised and lowered in the bore hole.
Figure 1B:
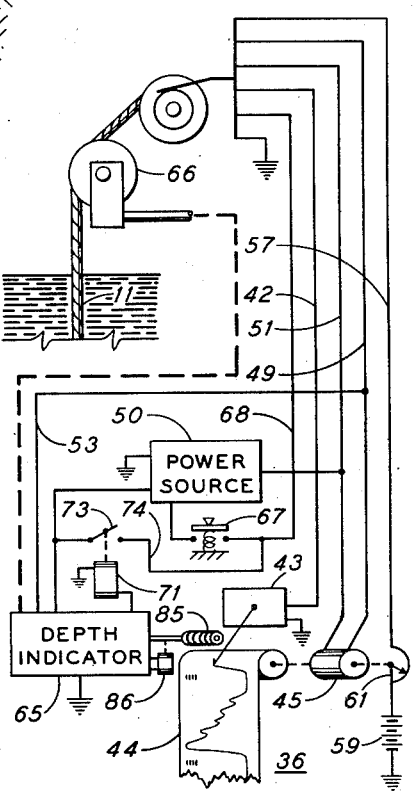
Fig. 1B is a schematic representation of the electrical circuits adapted to control and receive the low-frequency information transmitted over the well cable for recording at the earth's surface.

Referring now to the drawings, and in particular to the frequency-transforming system of the present invention, as embodied in the arrangements of Figs. 1A and 1B, there is illustrated a logging sonde 10 adapted to traverse a well bore on a standard well logging cable 11, preferably of the multi-conductor type, and having a steel core (not shown), upon which logging sonde 10 may be raised and lowered throughout the entire depth of well bore 12. In the present embodiment, the frequency transforming system has been illustrated as being particularly applied to a well logging system adapted to measure the characteristic energies of individual gamma ray quanta of the neutron-capture type, arising from excited nuclei within an earth formation 13 after capture of neutrons supplied from a neutron source 14 in the lower section of logging sonde 10. Neutron-capture gamma rays arising from the formation in this arrangement are detected by scintillation crystal 15, and the energy of each of the incoming gamma rays is arranged to be detected and measured by conversion to an electrical pulse generated by photomultiplier tube 16 and linear amplifier 18.

As mentioned hereinabove, these incoming gamma rays, detected by the scintillation crystal 15, are each of sufficiently short duration (about one microsecond) so that a high-frequency system is required in the handling and transmission of such signals to obtain a representative sampling of each of the unknown sources within formation 13. Additionally, if the speed of operation of the logging sonde through a well of, say, 10,000 feet depth is to be sufficiently fast to be economically useful, it is essential that the neutron source 14 be quite large so that the neutron-capture gamma ray quanta may be sampled at the rate of about 100,000 per second. To this end, the present invention provides a system wherein the individual gamma ray quanta may be recorded and integrated over a predetermined interval. This integration and the subsequent transformation of the information into a substantially low-frequency signal is accomplished in accordance with this invention by controlling the positioning of an electrostatic charge on a predeterminable area of a storage surface, such as target electrode 20 of storage tube 17.

In a preferred manner of operation, the positioning of these electrostatic charges on storage surface 20 is controlled in accordance with the amplitudes of the individual electrical pulses, the amplitude of each pulse corresponding to the energy of an incoming gamma ray detected by crystal 15 as developed by photomultiplier tube 16 and linear amplifier 18. The output of amplifier 18 may be connected to one of the sets of deflection plates, such as those designated as 21, in manner so that each pulse deflects the cathode ray beam generated by electron gun 23, in a predetermined direction whenever a pulse occurs.

The output of linear amplifier 18, in the present embodiment, is also utilized to turn on the cathode ray beam, so that the beam which is normally biased below its cut-off point, reaches target 20. This is accomplished by operation of the gate circuit 19 when a pulse is amplified by amplifier 18. As illustrated, a sweep circuit 22 is connected to the deflection plates 25 to control the sweep of the cathode ray beam at a free-running, predetermined rate across the width of target 20. However, as noted above, the cathode ray beam is normally biased sufficiently negative so that the beam is unable to reach target 20 until the occurrence of an electrical pulse generated by linear amplifier 18. This biasing of the beam to a conductive condition may be for any desired time, but desirably is only of sufficient duration to place a portion of a line on the target. Thus, each individual pulse amplitude may be recorded on the target surface 20, not only as a predeterminable area, sufficiently small to permit individual identification, but also at a location dependent upon the characteristic energy of the incoming gamma ray, as detected by crystal 15.

Where the non-conductive surface 27 of target 20 is capable of integrating a large number of individual traces, the individual gamma ray energies may be recorded on the target surface as a line running across the width of the target screen. However, in a preferred manner of operating the apparatus shown in Fig. 1, only a predeterminable segment of a line or a point is traced across the face of the target with the location of the line, of which the point is a portion, being selected as in the case where a complete line is utilized. Thus, the individual pulses corresponding to an individual gamma ray energy may be integrated on the non-conductive surface even where that surface is not capable of storing or integrating a large number of repeated traces. However, with this method of operating to store the high-frequency pulses on the target surface, a much greater number of electrostatic charges may be accumulated by a target surface even where the target area is capable of integrating repeated passages of the cathode ray beam over the same area. Thus, the insulating surface 27 of target 20 may be made conductive to different degrees at discrete areas selected in accordance with the magnitude and quality of the high-frequency signal to be recorded. In the present embodiment the charge density at a particular location on the target surface represents a quantitative measure of a particular gamma ray energy, which in turn is representative of a constituent element in the earth formation surrounding the well bore.

Figure 2:
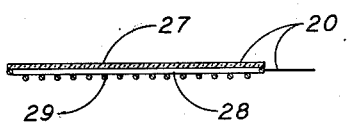
Fig. 2 is an enlarged view of a cross-section through the storage surface or target of the frequency-transforming tube used in the arrangement of Fig. 1A.

The deposition of electrostatic charges on discrete areas of target 20, particularly illustrated in Fig. 2, results from the cathode ray beam penetrating conducting surface 28 and causing the charges to be deposited on the non-conductive layer 27, which has a thickness of about one-half micron. The work surfaces 27 and 28 are supported upon a screen of approximately 500 mesh, or greater, indicated at 29. The construction of target surface 20 is such that when the writing ray beam from electron gun 23 is accelerated with sufficient potential, to the order of about 10 kilovolts, the non-conductive coating 27 is rendered conductive. Then, at the point where target 20 is struck by the beam, coating or layer 27 accumulates an electrostatic charge which is different from the charge of the remainder of the surface 27. This point or area, in accordance with the invention, is made conductive during such times as the electrical pulses are generated in response to a gamma ray arriving at crystal 15 and positioned at a point along a predeterminable line on the target surface, in accordance with the energy of the quanta. Thus, there is accumulated on target 20 over a period of time a representative sample of all the energies instantaneously measured by the scintillometer and its electrical conversion system, which is positioned in the well bore adjacent the earth formation whose characteristics are under observation.

The accumulation of a total number of discrete signal pulses on target 20 may be controlled either in accordance with a predetermined time schedule, or, as illustrated, a predetermined number of pulses are measured by preset counter 30. Counter 30 is arranged to receive each pulse produced by linear amplifier 18, and, upon receipt of a predetermined number of pulses, energizes relay 32 to close its contacts 33 and 34. The closing of contacts 33 and 34 completes the transmission circuits to obtain at the surface recording equipment, indicated generally as 36, an electrical signal modulated as a low-frequency form of signal and representative of the total information accumulated on target 20.

In the arrangement illustrated in Figs. 1A and 1B, this frequency-transforming operation is particularly set into operation by the closing of contact 34, which permits power to be supplied through gate 46 to electron gun 38 of storage tube 17. Electron gun 38 is adapted to scan the opposite side of target 20 and produce therefrom an electrical signal flowing over conductor 39 to DC amplifier 40. The output signal from DC amplifier 40 is then transmitted by way of line 42 to the surface recording oscillograph, indicated generally as 43, for recording on chart 44 which, in turn, is driven by motor 45. The deflection of the cathode ray beam from the electron gun 38 is in synchronism with the operation of drive motor 45 due to the closing of contact 33 of relay 32 at the same time that electron gun 38 is energized through contact 34 and gate circuit 46. In the arrangement of Figs. 1A and 1B, contact 33 completes a circuit through line 49 for the energization of motor 45 by an AC power source 50.

In this embodiment, the reading cathode ray beam is generated by electron gun 38, including the control grids and focusing means, and is arranged to be deflected electromagnetically by a pair of concentric deflecting coils, indicated generally as 54 and 55. The inner coil 54, which may control the vertical deflection of the beam, is preferably energized by a direct current source through line 57. This direct current source may be battery 59, which is connected to line 57 through a variable potentiometer 61, adapted to be driven in synchronism throughout its range of operation by paper or chart drive motor 45. The outer deflecting coil 55, for driving the reading cathode ray beam in a horizontal direction, may be energized from the surface by power source 50, which is preferably a source of regulated 110-volt, 60-cycle AC. This control current is supplied by line 59 and permits the beam to scan freely across the target while the beam is deflected progressively downward by the varying DC supplied by line 57.

Thus, it will be seen that when, in the embodiment of Figs. 1A and 1B, a predetermined number of pulses have been recorded on target 20, the preset counter 30 will energize relay 32 to start the operation of the recording apparatus, including the drive of the recording chart. With recorder 43 connected to the output of amplifier 40 by line 42, the D. C. signal developed by amplifier 40 is modulated in response to the variations in electrostatic charges accumulated on non-conductive surface 27 of target 20. Thus, there is developed by the operation of the cathode ray beam, generated by electron gun 38, a low-frequency form of signal containing all of the required intelligence for recording a gamma ray spectrum which is capable of transmission over a conventional, multi-conductor, well logging cable 11.

An indication of the depth of logging sonde 10 may be provided on recorder paper 44 by depth indicator 65, which is operable in response to the position of logging cable 11, as measured by the rotation of pulley 66 on the winding drum for cable 11. As schematically shown, depth indicating marks are applied by counter mechanism 85 being brought into contact with paper 84 by relay 86. Counter 85 is coupled to the mechanical drive for depth indicator 65. Operation of the relay 86 by depth indicator 65 to place depth indicia on paper 84 is arranged to be operated when paper drive motor 45 for the recorder 36 is brought into operation by relay 32 in the logging sonde 10. For this purpose, line 53 is connected between motor energizing line 49 and depth indicator 65.

As shown, the reading on transmission of the low-frequency signal to the surface recording equipment may be initiated by any of three separate control circuits. Primarily, control of the reading function is provided by preset counter 30 located within the logging sonde, but, alternatively, control is provided by push button 67 which, through line 68, is adapted to energize relay 32, independently. Thus, there is provided control means for initiating the reading cycle, either in response to a predetermined number of counts, or in response to an operator's manual control. Control of the reading cycle may also be initiated in response to depth indicator 65, if so desired. This latter mode of control is provided by relay 71, which is operated in response to a predeterminable depth being measured at indicator 65. Energization of relay 71 at such predeterminable depth will cause contact 73 to close, thereby energizing line 68 to operate the downhole, reading control relay 32 through line 74.

Reference is now made to another form of apparatus for carrying out the method of the present invention, which is particularly illustrated in Fig. 3. As diagrammatically shown therein, a detector, indicated generally as 151, is coupled to linear amplifier 152 and, through gate 153, the detected information in the form of a high-frequency signal is applied to storage tube 156 through coupling capacitor 154 and grid 115 of tube 156. As particularly distinguished from the arrangement of Figs. 1A and 1B, storage tube 156 is adapted to employ a single electron gun in performing both the storage of the high-frequency pulses on target electrode 157 and the removal therefrom of the stored electrostatic charges for transmission as a low-frequency signal to surface recording equipment 36.

In performing the double function of recording or writing and generating or reading, storage tube 156 is provided with a single cathode ray beam generating gun 163 and a single storage surface or target 157. Operation of the tube either to perform its writing function or its reading function is controlled by the several sets of contacts operable by relay 159, which is adapted to be operated in manner similar to the control relay 32 in the arrangement of Fig. 1A. In the present embodiment, these control switches or contacts 170, 171, 172, 173 and 175 are all shown in the writing or recording position preparator for storage of the high-frequency form of signal on target 157. The alternate position of the several contacts converts storage tube 156 to its signal generating or reading function, and, as shown, these contacts provide proper operating potentials to the various electrodes of the tube.

In the position shown for the contacts, target 157 has its non-conductive or insulating surface prepared for writing by having substantially the same potential applied to said storage area by the previous reading of the electrostatic charges which had been deposited thereon. With this equilibrium of the potential existing throughout the storage surface, the high-frequency forms of electrical pulses are stored at locations on the surface in accordance with the amplitude of the electrical pulses as an electrostatic charge, as in the case of storage tube 17 in the arrangement of Fig. 1. However, as distinguished from the embodiment of Fig. 1, control of the cathode ray beam under writing conditions is provided by grid 115 which is coupled to pulse gate 153 through condenser 154. The operation of this circuit is such that grid 115 is held in a non-conductive or non-writing condition by bias battery 161 which is connected to the grid through resistor 162. With this arrangement, each bit of information measured at detector 151 causes a pulse to pass through gate 153 and apply a potential to grid 115, which permits the electron beam from gun 163 to strike target 157 at a position determined by deflection plates 165 and 167. Under writing conditions, that is, when the electrostatic charges are being deposited or accumulated on target 157, one set of electrostatic deflection plates, such as 167, is connected to a fast-sweep generator 169 to repetitively scan the cathode ray beam across the width of the target. The other set of deflection plates 165 for deflecting the beam in a direction perpendicular to the scanning direction is controlled by the output of linear amplifier 152. By this arrangement, the electron beam is positioned at a predetermined location on the target plate by the incoming pulse, and simultaneously the beam is gated on for a predetermined period of time. Ideally, this period of time is a small fraction of the width of a scanning line across the target surface. Thus, there may be accumulated at discrete areas a plurality of electrostatic charges whose location is predetermined by the magnitude of the incoming signal.

In order to explain the way storage surface 157 of tube 156 operates to perform both its writing and reading functions, it will be assumed that a reading has taken place, since the act of reading prepares the target surface for writing. When the target is scanned by the cathode ray beam with relay 159 in its other portion for reading, the insulator surface is charged to approximately the same potential as collector 180, i. e., zero potential. Thus, there is established a 50-volt difference in potential between the bombarded surface of the insulator and the target conductor plate. When contact 173 of relay 159 is then returned to the state shown in Fig. 3 for writing, the insulator surface is made 250 volts negative with respect to the collector. Now, when the beam is gated on by the pulses to be recorded, the areas bombarded by the beam will be charged by secondary emission to a less negative potential (for example from −250 to −225 volts). When relay 159 is again set for reading, all of the areas that were bombarded during the writing will then be positive with respect to the collector. The reading beam is arranged to discharge these points back to the zero or equilibrium potential and cause a change in the D. C. potential across the collector resistor 191 in accordance with the charge distribution on the target.

Following the accumulation on target 157 of a desired number of pulses, which may be controlled by preset counter 160, or at some other desirable time, as determined by the operator or the depth indicator, relay 159 is operated to transfer the control circuits for storage tube 156 to a reading, or transmitting condition. By the operation of relay 159, the bias on control grid 155 is reduced by movement of relay contact 170 so that the cathode ray beam may reach and scan the entire surface of target 157. The direction and rate of scanning is controlled by deflection plates 165 and 167 which are transferred by contacts 171 and 172, respectively, to a variable D. C. potential and a slow-sweep A. C. signal. This A. C. signal may be derived from power source 50 through conductor 49, while the variable D. C. is obtained from battery 59, potentiometer 61 and conductor 57. At the same time, the potential on target surface 157 is changed to its reading potential by movement of contact 173. As in the case of relay 32 in the arrangement of Fig. 1A, the control circuit for drive motor 45 for recorder 36 is energized by the closing of contact 175 in the logging sonde.

With the target electrode bias substantially reduced by movement of contact 173, the impingement of the cathode ray beam on the target causes the emission of additional secondary electrons from the insulating surface of target 157 when that portion of the insulating surface, having an electrostatic charge thereon, is contacted. These secondary electrons emitted from the target surface are accumulated on the collector ring 180, which is so biased with respect to the target by resistor 181 that there is developed a D. C. signal modulated in amplitude in accordance with the electrostatic charge or total electron density on the target surface. This D. C. signal is then applied through D. C. amplifier 182 to transmission line 42 for recording by oscillograph 43 on the recording chart 44. Through synchronization of the drive of chart 44 with the location of the reading beam, as determined by the bias applied by potentiometer 61 to plates 165, a record of the electrostatic charges on target 157 is made in accordance with the locations of the charges.

Thus, it will be seen that by the arrangements of both Figs. 1 and 3 there is effectively presented a method of developing from a high-frequency signal, a low-frequency form of electrical signal which is capable of being transmitted over a standard well logging cable. This low-frequency signal has transmission characteristics which permit recording at the earth's surface a spectrum of a plurality of measured characteristics, normally requiring a high-frequency signal for transmission without serious loss of information. In the recording and diagnosing of these measured characteristics, to determine the nature of the earth formation adjacent the well bore, the individual, measurable characteristics may be advantageously accumulated as electrostatic charges, and then transmitted by the present system, even where small amounts or individual bits of information can be transmitted as a low-frequency signal.

Accordingly, while the foregoing detailed description has been particularly directed to detecting frequency transforming and recording of gamma ray spectra, such as those derived from the detection of neutron-capture gamma rays, it will be apparent that any plurality of other measurable characteristic electrical signals, normally requiring transmission of high-frequency forms of intelligence over a well logging cable, may be accomplished by modification of the input circuits to storage tubes 17 or 156. For example, the information may be accumulated from a plurality of different logs, such as individual logs of natural gamma rays, neutron-neutron radiations, together with inductive logging and electrical logging, and effectively recorded or stored for a predeterminable length of the bore hole. This may be done by modulation of the writing beam of the cathode ray tube in response to successive bits of information so that each type of measured variable is positioned at a location on the target which is representative of that particular bit of information. The composite of several logs, or, selectively, any portions thereof, may thus be transmitted, at will, over a standard, low-frequency, narrow-band-pass logging cable without modification of the structural properties of said cable.

While various modifications and changes in the method of the present invention, particularly insofar as the apparatus, such as the type of storage tubes or electrical circuits, used in the transformation of high-frequency forms of information to a low-frequency signal, will occur to those skilled in the art, all such modifications and changes which fall within the scope of the appended claims are intended to be included therein.

I claim:

1. The method of recording at the earth's surface variations in the magnitude of a plurality of quantities measured along a well bore as an indication of the values of a plurality of measurable characteristics of earth formations traversed by said well bore which comprises detecting a plurality of measurable characteristics of said earth formation within said well bore, developing within said well bore a plurality of electrical signals, each of which represents one of said plurality of measurable characteristics of said earth formation, applying each of said electrical signals independently to a predeterminable portion of an electrostatically charge-modifiable storage surface positioned in said well bore, varying the extent of the charge-modification of said predeterminable portion of said surface in response to the magnitude of each of said electrical signals, selectively detecting the location and extent of the charge modification of said surface after a predetermined time interval, generating another electrical signal modulated in accordance with the detected location and extent of the charge modification developed on said surface, said other electrical signal being independent of the signal which originally modified said surface, transmitting said other electrical signal to the earth's surface over a transmission system of limited power and frequency characteristics, and recording said other signal in accordance with the depth of said earth formation whose characteristics have been measured.

2. The method of recording at the earth's surface a spectrum of nuclear energies characteristic of the constituents of an earth formation traversed by a well bore, wherein the individual energy measurements are indicative of the presence of a nuclear species and the frequency of occurrence of said measurements are representative of the relative quantities of said species which comprises positioning in said well bore a nuclear energy measuring system for detecting the randomly-occurring nuclear events occurring in said earth formation adjacent said well bore, developing an electrical pulse for each nuclear event detected whose amplitude is proportional to the energy of said event, converting each of said electrical pulses to an electrostatic charge, storing each of said charges on predeterminable portions of an intermediate storage surface, said portions being selected in accordance with the amplitudes of said pulses, varying the extent of the charge modification of said predeterminable portions in accordance with the frequency of occurrence of said pulses of a given amplitude, scanning said surface to determine the location and extent of the charge modification thereof, developing an electrical signal proportional in magnitude to the location and extent of said charge modification, transmitting said electrical signal to the earth's surface over a transmission system of limited power and frequency characteristics, and recording said signal at the earth's surface in accordance with the depth of said earth formation along said well bore, the amplitude and frequency of said electrical signal being representative of the total nuclear spectrum of said formation.

3. The method of recording at the earth's surface a spectrum of nuclear energies characteristic of the constituents of an earth formation traversed by a well bore, wherein the individual energy measurements are indicative of the presence of a nuclear species and the frequency of occurrence of said measurements are representative of the relative quantities of said species which comprises positioning in said well bore a nuclear energy measuring system for detecting the randomly-occurring nuclear events occurring in said earth formation adjacent said well bore, developing an electrical pulse for each nuclear event detected whose amplitude is proportional to the energy of said event, converting each of said electrical pulses to an electrostatic charge, storing each of said charges on predeterminable portions of an intermediate storage surface, said portions being selected in accordance with the amplitude of said pulses, varying the extent of the charge modification of said predeterminable portions in accordance with the frequency of occurrence of said pulses of a given amplitude, storing the distribution of said charges on said surface in accordance with the amplitude of said pulses over a predeterminable period of time, scanning said surface to determine the location and extent of the charge modification thereof, developing an electrical signal proportional in amplitude to the location and extent of said charge modification, transmitting said electrical signal to the earth's surface over a transmission system of limited power and frequency characteristics, and recording said signal at the earth's surface in accordance with the depth of said earth formation along said well bore, the amplitude and frequency of said electrical signal being representative of the total nuclear spectrum of said formation integrated over said predeterminable time period.

4. Apparatus for recording at the earth's surface a spectrum corresponding to the distribution of neutron-capture gamma rays produced by irradiating an earth formation traversed by a well bore with a neutron source comprising detecting means for developing an electrical pulse whose height is representative of the presence of a nuclear species producing a neutron-capture gamma ray in said formation, means for recording in said well bore the frequency of occurrence and the amplitudes of the randomly-occurring electrical pulses corresponding to the quantity and energy of each of said gamma rays, said means including a target electrode whose surface is adapted to be modified in electrical charge at a predeterminable location and to an extent dependent upon the modulation of an electron beam, and means for modulating the impingement of said electron beam on said target in accordance with the amplitude of said pulses to provide an integration of the quantity of electrical pulses of similar magnitude, means for generating an independent electrical signal proportional in amplitude to the total charge distribution stored on said target surface, cable means of limited power and frequency characteristics for transmission of said electrical signal to the earth's surface, recording means operable in synchronism with the generation of said electrical signal connected to said cable means at the earth's surface, and means for correlating the depth of said detecting means in said well bore with said electrical signal representing the total spectrum of neutron-capture gamma rays arising from said formation.

5. Well logging apparatus for recording at the earth's surface the relative average rates of occurrence of randomly-occurring electrical pulses of short duration and varying relative amplitudes comprising an elongated cable of limited power and frequency characteristics for supporting detecting means in a bore hole, means including said detecting means for measuring a characteristic of an earth formation traversed by said bore hole, means for converting said characteristic to a high-frequency form of electrical pulse, means for modulating an electron beam of a cathode ray tube in accordance with the occurrence of each of said electrical pulses, said cathode ray tube having a target including a non-conducting surface and a conducting surface in contact with each other, means for distributing on predeterminable portions of one of said surfaces an electrostatic charge, means for selecting one of said predeterminable portions in response to the magnitude of the characteristic represented by said electrical pulses, means for scanning the charge-modified surface of said target independently of the electron beam producing said charges, means for developing an electrical signal proportional in amplitude to the charge distribution detected by said scanning means, and means for transmitting said proportional electrical signal over said elongated cable to a recording device at the earth's surface, said device being operable in synchronism with said scanning means.

6. Well logging apparatus for recording at the earth's surface the relative average rates of occurrence of randomly-occurring electrical pulses of short duration and varying relative amplitudes comprising an elongated cable of limited power and frequency characteristics for supporting detecting means in a bore hole, means including said detecting means for measuring a characteristic of an earth formation traversed by said bore hole, means for converting said characteristic to a high-frequency form of electrical pulse, means for modulating an electron beam of a cathode ray tube in accordance with the occurrence of each of said electrical pulses, said cathode ray tube having a target including a non-conducting surface and a conducting surface in contact with each other, means for distributing on predeterminable portions of one of said surfaces an electrostatic charge, means for selecting one of said predeterminable portions in response to the magnitudes of said electrical pulses, scanning means for determining the location and extent of the charge-modified surface of said target independently of said electron beam producing said charges, means for developing an electrical signal proportional in amplitude to the charge distribution detected by said scanning means, said signal developing means being adapted to return the portions of the charge-modified surface to electrostatic equilibrium with the remainder of said surface for acceptance of further charges representative of pulses on said target, and means for transmitting said proportional electrical signal over said elongated cable to a recording device at the earth's surface, said device being operable in synchronism with said scanning means.

7. The method of recording at the earth's surface variations in the magnitude of a plurality of quantities measured along a well bore as an indication of the values of a plurality of measurable characteristics of earth's formations traversed by said well bore which comprises detecting a plurality of measurable characteristics of said earth formation within said well bore, developing within said well bore a plurality of electrical signals, each of which represent one of said plurality of measurable characteristics of said earth formation, converting each of said electrical signals to an electrostatic charge of substantially equal value independently locating said charges on one of a plurality of predeterminable portions of an electrostatically charge-modifiable storage surface positioned in said well bore, varying the position of said charges on said surface in response to the magnitude of each of said electrical signals, the extent of charge on each of predeterminable portions of said surface being modifiable to provide an integration of said electrical signals over a predeterminable time interval, selectively detecting the location and extent of the charge modification on said surface after said predetermined time interval, generating another electrical signal modulated in accordance with the detected location and extent of the charge modification developed on said surface, transmitting said other electrical signal to the earth's surface over a transmission line of limited power and frequency characteristic, and recording said other signal in accordance with the depth of said earth formation whose characteristics have been measured.

8. Apparatus for recording a spectrum corresponding to the neutron-capture gamma rays produced by irradiating a sample of unknown material with a neutron source comprising detecting means for developing an electrical signal whose pulse height is representative of the energy of a neutron-capture gamma ray arising from a nuclear species in said sample, means for recording the frequency of occurrence and the amplitudes of the randomly-occurring electrical pulses corresponding to the quantity and energy of each of said gamma rays, said means including a target electrode whose surface is adapted to be modified in electrical charge, and means for positioning an electron beam on said target to modify the charge thereon, means for gating said beam to produce an electrostatic charge of a given value in response to each electrical pulse, means for varying the position of said electron beam in accordance with the amplitude of said pulses, timing means for controlling the degree of integration of the quantity of electrical pulses of similar magnitude on said target, means for developing an independent electrical signal proportional in amplitude to the total charge distribution stored on said target surface, and means operable in synchronism with said electrical signal for transmitting said signal to a recording device to display the total spectrum of neutron-capture gamma rays from said sample.

9. Apparatus for recording a gamma ray energy spectrum of a sample of unknown material comprising detecting means for developing an electrical signal whose pulse height is representative of the individual energy of the gamma rays from said sample, means for recording the frequency of occurrence and the amplitudes of the randomly-occurring electrical pulses corresponding to the quantity and energy of each of said gamma rays, said means including a target electrode whose surface is adapted to be modified in electrical charge, and means for positioning an electron beam on said target to modify the charge thereon, means for gating said beam to produce an electrostatic charge of a given value in response to each electrical pulse, means for varying the position of said electron beam in accordance with the amplitude of said pulses, timing means for controlling the degree of integration of the quantity of electrical pulses of similar magnitude on said target, means for developing an independent electrical signal proportional in amplitude to the total charge distribution stored on said target surface, and means operable in synchronism with said electrical signal for transmitting said signal to a recording device to display the gamma ray energy spectrum of said sample.

References Cited in the file of this patent

UNITED STATES PATENTS

| | | |
|---|---|---|
| 2,535,817 | Skellett | Dec. 26, 1950 |
| 2,686,268 | Martin et al. | Aug. 10, 1954 |